A. M. KENNEDY.
RANGE FINDER.
APPLICATION FILED JAN. 27, 1913. RENEWED JULY 28, 1915.

1,154,252.

Patented Sept. 21, 1915.
2 SHEETS—SHEET 1.

Inventor
A. M. Kennedy,
By John W. Wolf
his Attorney

Witnesses
E. G. Marshall
W. F. Allen

UNITED STATES PATENT OFFICE.

ABSALOM M. KENNEDY, OF WEST ORANGE, NEW JERSEY.

RANGE-FINDER.

1,154,252.  Specification of Letters Patent.  Patented Sept. 21, 1915.

Application filed January 27, 1913, Serial No. 744,412. Renewed July 28, 1915. Serial No. 42,455.

*To all whom it may concern:*

Be it known that I, ABSALOM M. KENNEDY, a citizen of the United States, residing at West Orange, in the county of Essex and State of New Jersey, have invented certain new and useful Improvements in Range-Finders, of which the following is a specification.

This invention relates more especially to an electrical range finding system in which the distance is indicated directly in units of length and in which the readings are independent of the voltage and resistance of the electric circuit.

Range finding has hitherto been done by reading the angles at two stations made with the object, and telephoning these angles to an operator who duplicates them with scaled rulers on a plane table and reads the distance to the object by means of the scale. Or from an elevated station; in which case the distance to the object is calculated from the angle made with the vertical by a line to the object by well known trigonometric formulæ. Both methods require the distance to be computed after the angles have been read.

The primary object of this invention is to do away with the necessity of making computation in range finding, and this I do by providing a system of apparatus from which the ranges may be read directly.

A further object of the invention is to provide an electrically operated direct reading range finding system.

In order to more fully describe my said invention, reference will be had to the accompanying drawings, wherein—

Figure 1:
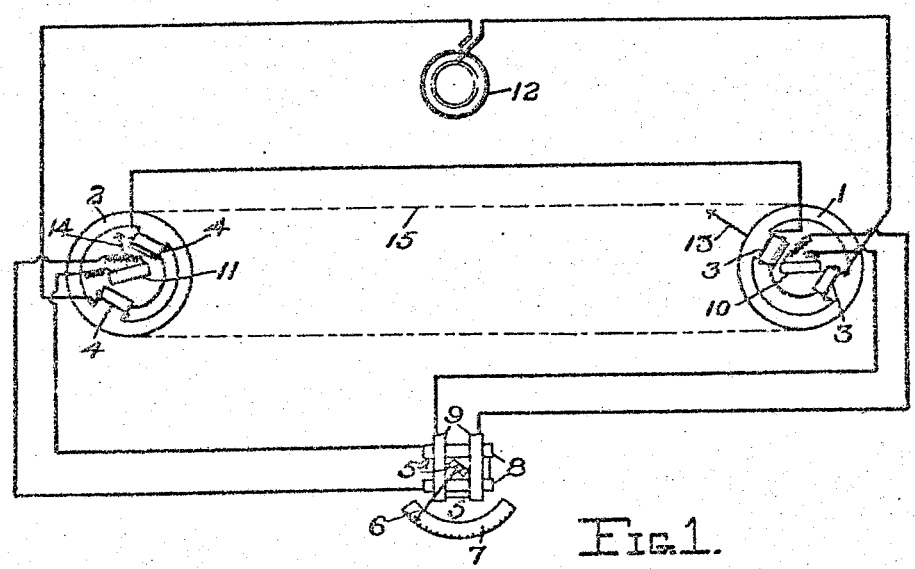
Figure 2:
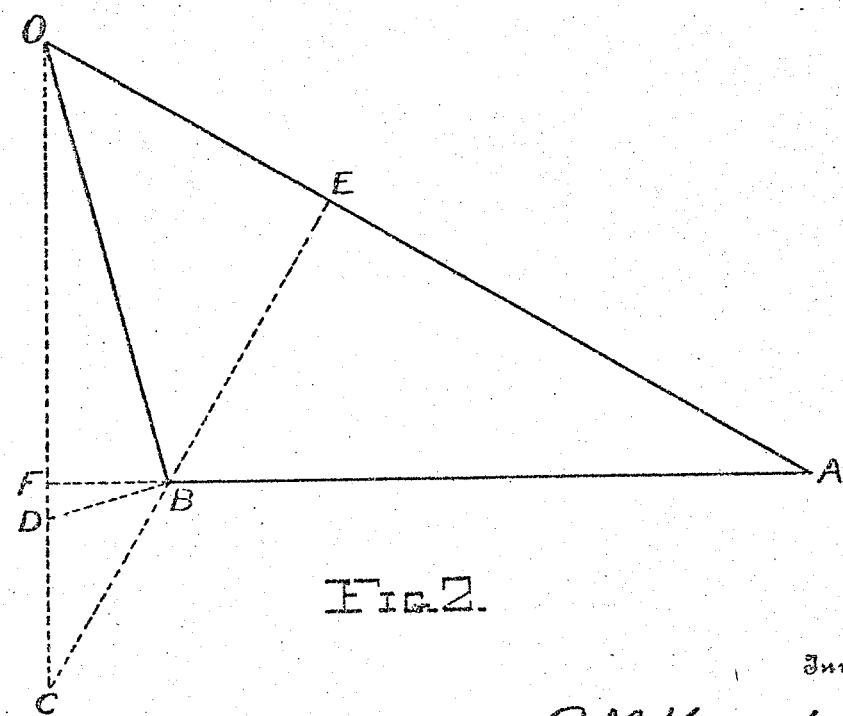
Figure 3:
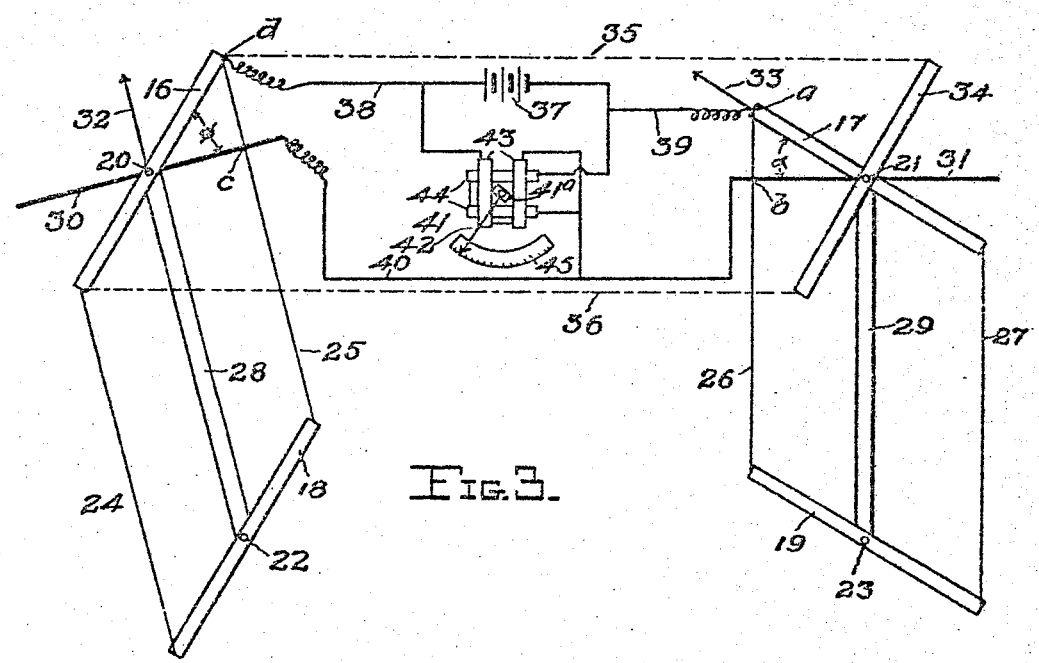

Figure 1, shows diagrammatically one form of my invention for finding the range by induction; Fig. 2, a geometric diagram to prove the theory of the operation of the said apparatus; Fig. 3, an alternative form of my invention for finding the ranges conductively, and Fig. 4, a diagram illustrating still another form of my invention.

Referring to Fig. 1, 1 and 2, represent cores or fields preferably of laminated iron on which are wound coils of wire 3 and 4, respectively, in such a manner that magnetic poles are formed at the polar projections thereof. Each field is pivoted in any desired way so as to revolve around a central axis. The numeral 5 represents an electric meter or measuring instrument calibrated in units of length, as yards, and having an indicating needle 6 movable over a scale 7, and attached to an armature 5ª whose movement is controlled by two sets of coils 8 and 9. This armature may consist, for alternating currents, of a short-circuited coil of wire or of a thin strip of laminated iron, and for direct current, of a thin strip of iron. The angular position of this armature must depend only on the relative strength of the current in the two sets of coils 8 and 9, and not on any external force. The meter thus measures simply the proportion of these currents and no absolute amount at all.

The numerals 10 and 11 represent two armatures located as shown, between the polar extensions of fields 1 and 2 and consisting of coils of wire, armature 10 being fixed and armature 11 is arranged to revolve about the axis of field 2.

12 represents a source of alternating or pulsating electric current, while the arrows 13 and 14 represent telescopes directed at the object whose distance is to be determined, and made fast, respectively, to field 1 and armature 11. The telescope 13 is always in alinement with the polar projections of the field 1, while the telescope 14 is always at right angles to the plane of the armature 11, as shown.

The fields 1 and 2 are so connected that an angular movement of one will produce an equal angular movement of the other, and the polar projections of field 2 are to be at all times at right angles to those of field 1. This equal angular movement may be produced by making the outer diameters of the fields 1 and 2 equal, and connecting them by a belt or chain 15, or in any other desired way.

The polar projections of the fields 1 and 2 have parallel faces whose cross-section is approximately equal to the cross-section of armatures 10 and 11. In this case the space between these polar projections will be traversed by magnetic lines of practically uniform density. If armature 11 be placed in such a position that the plane of its longitudinal axis (the axis at right angles to the arrow 14 and in the same plane therewith) coincide with a straight line drawn from the center of one pole piece to the other of field magnet 2, which is the neutral position of the armature or the one in which it contains the least number of magnetic lines of force, and if said armature be rotated from said position while an alternating current passes through coils 4, the voltage generated in armature 11, as it is thus rotated, is as the sine of the angle of revolution from said neutral position.

To trace the electric circuit and explain the functions of the various parts: leaving one, say the right brush of the alternator 12, the current is conducted to coils 3 of field 1 wound so that each of its polar projections, at any instant, will be magnetized in a relatively opposite direction. From coils 3 the current is conducted to coils 4 of field 2 wound similar to those of field 1. From field 2 the current is conducted back to 12, thus completing the circuit. Armature 10 is connected to coil 9, and armature 11 to coil 8 of meter 5, as shown.

In operation, the telescopes 13 and 14 are pointed to the object. This turns field 1 so that its polar projections are in line with the object. This revolves field 2 so that its polar projections are at right angles with those of field 1. The armature 11 will be at right angles to the direction of its own telescope or, in other words, at right angles to a line drawn from its axis of rotation to the object.

According to the following proof the angle formed by the polar projections of field 2, with the armature 11, is the same as the angle made at the object by two lines drawn from the object to the center of rotation of the two instruments 1 and 2.

Referring to Fig. 2, let A and B represent the stations and O the object. If line CE is drawn $\perp$ AO; CC $\perp$ AB; DB $\perp$ OB; the right triangles AOF, CBF and OCE are similar, and the right triangle DBF is similar to OBF; having equal angles, $$\therefore \angle FBC = \angle AOF$$
and—
$$\angle FBD = \angle BOF$$
$$\therefore \angle FBC - \angle FBD = \angle AOF - \angle BOF$$
or—
$$\angle DBC = \angle AOB$$

or the angle made by the armature 11 with the polar projections of field 2 is the same as the angle at the object formed by lines drawn to the center of rotation of the two fields 1 and 2.

Referring to Fig. 1, armature 10 is connected to coils 9, and armature 11 to coils 8 of meter 5. Because of the absence of any other controlling force, the armature of meter 5 will take a position which depends on the relative amounts of current in coils 8 and 9. These currents will be as the electromotive forces generated in armatures 11 and 10, respectively. Since the same current flows through coils 3 and 4 and the electromotive force generated in armature 10 is as the sine of the angle OAB (or angle A) in Fig. 2, and the electromotive force generated in armature 11 is as the sine of the angle AOB (or angle O) in Fig. 2, according to the trigonometric formula $$a = \frac{o \text{ sine } A}{\text{sine } O}$$

where $a$ and $o$ represent the sides of the triangle AOB opposite angles A and O respectively, the meter 5 will, after proper calibration, read the distance from station B to the object O. Since the same current flows through coils 3 and 4, it is also evident that the electromotive forces generated in armatures 10 and 11 will be independent of the voltage of alternator H or variations in the resistance of the generator circuit.

Referring now more especially to the form of my invention shown in Fig. 3; 16, 17, 18 and 19 represent strips of insulating material pivoted at their centers 20, 21, 22 and 23, respectively, the said strips all being of the same length. The ends of strips 16 are connected to corresponding ends of strip 18 by wires 24 and 25 of relatively high resistance, and the ends of strips 17 and 19 are similarly connected by similar wires 26 and 27.

Numerals 28 and 29 indicate strips of insulating material connecting the pivotal points 20—22 and 21—23 respectively. Made fast to these strips 28 and 29 at pivots 20 and 21, are two pieces of electrical conducting material 30 and 31 of relatively low resistance, the said conductors being at all times at right angles to the strips 28 and 29.

Conductor 30 is the one which is adapted to turn with the telescope or finder and is therefore pivoted at 20. The telescope, which I have indicated here only diagrammatically as by arrow 32, is mounted so as to always point at right angles to the conductor 30. The conductor 31, however, remains stationary and in line with 20, while the strip 17 turns with the telescope or finder at that station. The telescope indicated by the arrow 33 in this case, however, always points longitudinally of strip 17 or parallel to its longitudinal axis. The wires 25 and 26 make sliding contact with conductors 30 and 31 respectively. Also pivoted at 21 is an insulating strip 34 of the same length as strip 16, and these strips are so connected that angular movement of one about its pivot imparts a corresponding movement to the other. In the diagram, I have indicated this as being accomplished by connecting the ends of strip 16 to corresponding ends of strip 34 by wires or cords 35 and 36 indicated in broken lines to distinguish them from the electric circuits of which they form no part. The strips 17 and 34 are made fast together so that their longitudinal axes will always be perpendicular to each other. Strip 16 will therefore always be at right angles to strip 17.

The distance from pivot 20 to the upper end (d) of strip 16 should equal the distance from pivot 21 to the corresponding end of strip 34. Also, the distance from pivot 20 to the upper end of strip 16 should equal the distance from pivot 22 to the corresponding end of strip 18, and the distance from 21 to the upper end (a) of strip 17 should equal the distance from pivot 23 to the corresponding end of strip 19. By "end" is meant point of connection of wires 25, 35 and 26. Wire 25 will therefore keep parallel to itself and perpendicular to conductor 30 as strip 16 revolves around pivot 20, and wire 26 will keep parallel to itself and perpendicular to conductor 31 as strip 17 revolves around pivot 21. Therefore the distance from $a$ to $b$, and consequently the portion of the wire 26 will be as the sine of the angle $a$, and in like manner the resistance of that portion of the wire 25 between its point of contact $c$ with conductor 30 and the point $d$ will be as the sine of the angle $\varphi$. Strips 28 and 29 need not necessarily be of the same length. In this case the electric current may be either alternating or direct. In the diagram, I have indicated by battery 37 a source of direct current. The plus pole of this battery is connected through conductor 38 to the wire 25 at $d$, and the negative pole is connected through wire 39 to the wire 26 at $a$. The conductors 30 and 31 are electrically connected by wire 40. A meter 41 having two sets of coils 43 and 44, a movable armature 41ª as described with reference to meter 5, Fig. 1, a pointer 42, and a scale 45 calibrated in units of length is connected to the conductors 38, 39 and 40, as shown.

To operate, the telescopes 32 and 33 are pointed at the object. The effect of this is to place the longitudinal axis of strip 17 in line with the object, and the conductor 30 at right angles thereto; that is, at right angles to a line drawn from pivot 20 to the object. Strip 16 will be at right angles to strip 17, and, as previously shown, angle $\varphi$ will be the same as angle made at the object by lines drawn thereto from the points 20 and 21 at the two stations.

With the telescopes pointed as shown, current leaving the plus side of the battery 37 follows wire 38 through a flexible lead to $d$, thence down wire 25 to $c$, thence along conductor 30, through a flexible lead, through wire 40 to $b$, thence along wire 26 to $a$, thence through flexible lead and wire 39 to battery. Now the wires 25 and 26 between points $d$—$c$ and $a$—$b$ are the only appreciable resistances in the circuit, and have electromotive forces around them as their resistances since the current is the same in each case. Coils 43 are in shunt around $d$—$c$ and the current in them is as the electromotive force around $d$—$c$. Likewise, coils 44 are in shunt around $a$—$b$, and the current through them is as the electromotive around $a$—$b$. Therefore, since the distances between points $a$ and $b$, and between points $d$ and $c$ are as the sines of angles $a$ and $\varphi$ respectively, the movement of the meter indicator will be as the proportions between these sines, and, according to the formula $$a = \frac{o \text{ sine A}}{\text{sine O}}$$

the meter may be calibrated to read the distance from station B to object O, Fig. 2.

As with the inductive method first described, the indication of pointer 42 is independent of the voltage of the generator or variation of resistance of the generator circuit, since the meter simply measures the relative E. M. Fs. of $d$—$c$ and $a$—$b$, and this relation is constant though the E. M. F. or resistance may vary.

Wires 24 and 27 are counterparts of wires 25 and 26, and become useful when the object is in another quadrant from that to which the telescopes in Fig. 3 are pointed, as, for example, in case the telescopes are pointed toward the bottom of the sheet instead of toward the top thereof as shown.

Whenever conductor 30 is rotated, strip 28 swings about pivot 20. Strip 29, however, remains stationary.

Figure 4:
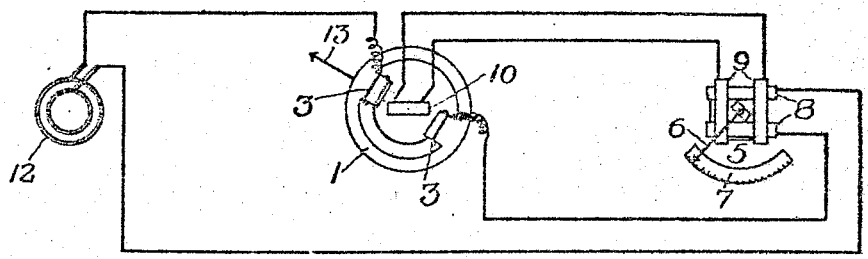

To measure the distance from an elevated station to an object, but one instrument (station) is required, since the distance is equal to the vertical height of the station divided by the sine of the angle made by a horizontal line and the line to the object. In this case one of the sets of coils as 8 of the meter 5 may be connected in series with the generator 12 and field coils 3, while the other set of coils 9 of the meter may be connected in series with the armature 10 of the station instrument as shown in Fig. 4.

Various other modifications may be made without departing from the spirit of my invention.

What I claim is:—

1. Range finding apparatus, comprising an indicating instrument subject to the influence of two opposing electrical forces, and means including a finder having two relatively movable electrical elements coöperative to vary the electrical forces acting on said instrument in accordance with the variation in the angular relation of said elements of the finder.

2. Range finding apparatus, comprising a meter adapted to measure the proportion between two variable electromotive forces and having a movable range indicating member, and means comprising a source of electromotive force and a finder having two relatively movable electrical elements coöperative with each other and with said source of electromotive force to vary the proportion of the electromotive forces in said meter and to thereby cause the same to indicate the ranges.

3. Range finding apparatus, comprising a meter having means to measure the proportion between two variable electromotive forces and having a scale calibrated in units of length and an indicating member relatively movable with respect to said scale and coöperating therewith to indicate the range directly, and means comprising a source of electromotive force and a finder having two relatively movable electrical elements coöperative with each other and with said sources of electromotive force to vary the proportion of the electromotive forces in said meter as the displacement between the two relatively movable electrical elements of the respective finders varies.

4. Range finding apparatus, comprising a meter having means to measure the proportion between two variable electromotive forces and having a scale calibrated in units of length and an indicating member relatively movable with respect to said scale and coöperative therewith to indicate the range directly, and means comprising a source of electromotive force and a finder having two relatively angularly movable electrical elements coöperative with each other and with said source of electromotive force to vary the proportion of the electromotive forces in said meter as the sines of the angles of displacement between the two relatively movable electrical elements of the respective finders.

5. A range finder, comprising a pair of finders embodying relatively movable electrical elements, a source of electric current connected to certain of said elements, the latter modifying said current according to the relative positions occupied by the finders, and an indicator having a movable index responsive to such modifications of the current, and operative thereby to indicate the range directly.

6. Range finding apparatus, comprising an indicating instrument adapted to measure the proportion between two electromotive forces and having means to indicate the ranges directly, and means to operate said instrument comprising a source of electromotive force and two finders each having two relatively movable electrical elements mutually coöperative to vary said electromotive forces.

7. Range finding apparatus, comprising an indicating instrument adapted to measure the proportion between two electromotive forces and having means to indicate the ranges directly, and means to operate said instrument comprising a source of electromotive force and two finders each having two relatively movable electrical elements mutually coöperative to vary said electromotive forces, one of said finders being provided with a telescope movable with one of the movable electrical elements thereof, and the other finder with a telescope movable with a different electrical element.

8. Range finding apparatus, comprising two electrical circuits, an indicating instrument having a set of coils, one set in each of said circuits, and a range indicator relatively movable with respect to said coils, a source of electromotive force, and means coöperative therewith to operate said indicating instrument, said means comprising a finder having two relatively movable electrical elements coöperatively arranged to vary by their mutual angular displacement the electromotive forces in said circuits, one of said circuits receiving current constantly from said source of electromotive force, and the other of said circuits receiving current only by induction between said relatively movable element.

9. Range finding apparatus, comprising two finders each having two relatively movable inductively related electrical elements, an electric meter connected in circuit with one of said elements of each finder and receiving current inductively generated therein by the angular displacement between the two said relatively movable elements, and a source of electricity connected to the other element, substantially as described.

10. Range finding apparatus, having two electrical finders each comprising an armature and a coöperatively arranged field, the fields of one instrument set at an angle of 90° from the other, and adapted to turn with an equal angular movement with the other field, energizing coils for said fields, a source of electric current connected thereto, and a meter having two sets of coils one set connected in circuit with the armature of one finder, and the other set in circuit with the armature of the other finder and adapted to measure the proportion between the electromotive forces of the armatures of the two finders and calibrated in units of length to read the distances directly, substantially as described.

11. Range finding apparatus, comprising two finders having each a field, an armature and circuits therefor, which armatures generate electromotive forces varying as the sines of the angles made by them with their respective fields, a meter adapted to measure the proportion of said electromotive forces, and a source of electric current for energizing said fields, substantially as described.

In testimony whereof I affix my signature in presence of two witnesses.

ABSALOM M. KENNEDY.

Witnesses:
  E. H. VOLCKMANN,
  H. M. ROBERTS.